Jan. 7, 1958  H. F. SMITH  2,818,576
WATER CLOSET FLUSH VALVE ASSEMBLY
Filed March 15, 1956
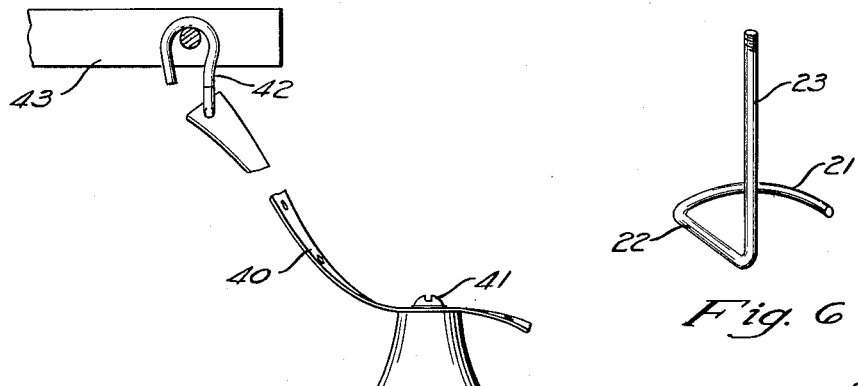
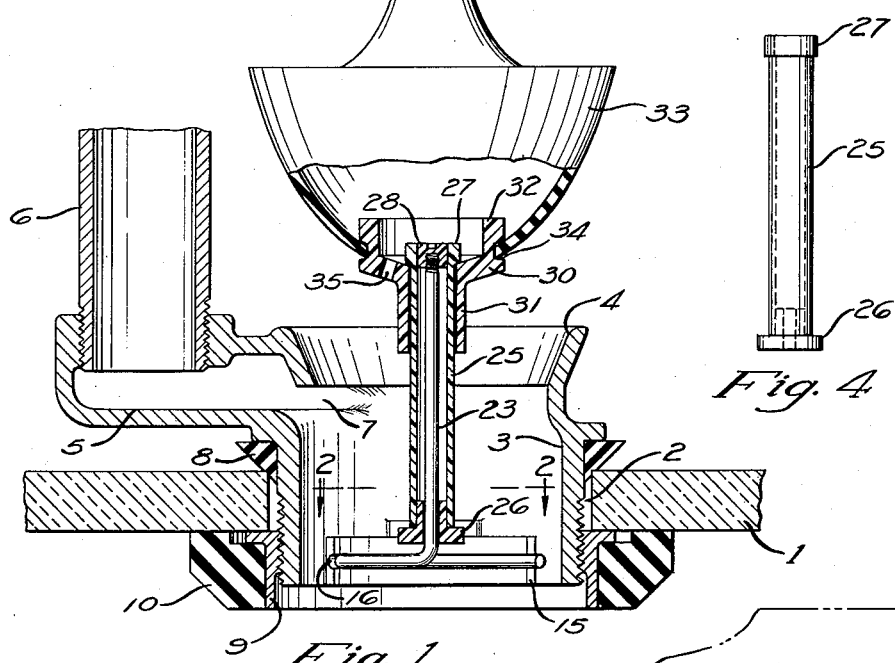
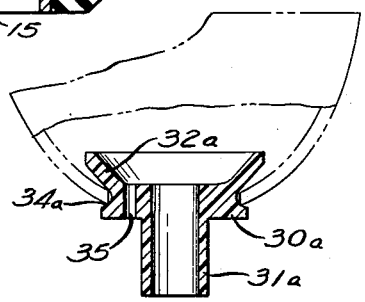
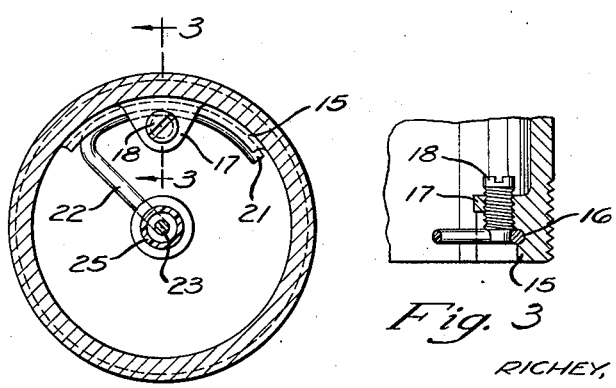
INVENTOR.
HARRY F. SMITH
BY
RICHEY, WATTS, EDGERTON & McNENNY
B.D. Watts
ATTORNEYS United States Patent Office 2,818,576
Patented Jan. 7, 1958

2,818,576

WATER CLOSET FLUSH VALVE ASSEMBLY

Harry F. Smith, Lexington, Ohio, assignor to Mansfield Sanitary Pottery, Inc., Perrysville, Ohio, a corporation of Ohio Application March 15, 1956, Serial No. 571,806

4 Claims. (Cl. 4—57)

This invention relates to flush valves for toilet tanks and is particularly concerned with a new flush valve unit comprising a spud, a float valve, and means within the spud for guiding the float valve.

Flush valves are well known in which the valve shank has a valve seat at its upper end and a laterally extending hollow portion supporting a vertical overflow pipe. The rod extending upwardly from the float valve passes through a narrow guide attached to the overflow pipe and a flush lever is attached to the upper end of the rod above the guide.

Such valves are not entirely satisfactory because of the uncertainty of seating of the float valve on its seat on the spud and the frequency with which the valve is so inaccurately seated that water continually leaks out of the tank. One reason for this inaccuracy in seating is that the guide for the rod is relatively short and is spaced a considerable distance above the valve seat and the rod is considerably smaller in diameter than the guide hole in the guide. Another reason is that the guide can be rotated accidentally about the overflow pipe with resultant shifting of the float rod and valve. These several factors permit the valve and rod to shift out of vertical position and for the float valve to be seated off center on the spud or for the rod to be bent with similar resultant inaccurate seating of the float valve.

Although numerous efforts have been made to overcome this inaccurate seating none of the proposed solutions has been entirely satisfactory as far as I am aware.

According to the present invention the spud is provided with a new guide which is attached thereto above the lower end of the spud and which at the valve seat level is positioned centrally of the valve seat, this guide being provided with concentric parts each limited in the length of its axial movement and the upper one being connected to a float valve. By this invention accuracy of the seating of the float valve is assured, parts required by prior constructions have been omitted and the use of a simple, flexible member to connect the flush valve with a float lever is made possible.

In the drawings accompanying and forming a part of this specification:

Fig. 1 is a vertical section taken through a device embodying the present invention and shown in position in relation to a fragmentary part of the bottom wall of the flush tank;

Fig. 2 is a horizontal cross-sectional view taken on line 2—2 of Fig. 1;

Fig. 3 is a fragmentary vertical section taken on line 3—3 of Fig. 2; and

Figs. 4, and 5 and 6 are enlarged views of parts of the float valve guide.

In Fig. 1 the bottom wall of a flush tank is indicated fragmentarily at 1, this wall having an opening 2 therethrough in which is positioned a spud 3 having a float valve seat 4 at its upper end and a hollow, laterally extending portion 5 supporting an upright overflow pipe 6 and opening into the central passage 7 in spud 3. The spud may be secured in place in the tank, and the space 2 around the spud may be sealed against escape of liquid therethrough, by means of a gasket 8 surrounding the spud 3 and pressing against the inner surface of the tank, thereby preventing ingress of water into the space 2; and by a metal ring 9 which is screwed onto the threaded lower end of spud 3 and which preferably has fixed thereto a gasket 10 which is engageable with the under surface of the tank and with the upper surface of an inlet opening in a bowl through which liquid is discharged from spud 3. The structure just described may be substantially the same as that shown in my U. S. Patent No. 2,590,471.

Near the lower end of spud 3 an arc-shaped member 15 is integral with, or is separate from, but secured to the inner surface of the spud. This member has an arcuate groove 16 and an ear 17 in which a screw 18 is adjustably positioned. A guide rod includes an arc-shaped portion 21, a radial portion 22 leading inwardly therefrom and a straight axial portion 23 at the inner end of portion 22. The arc-shaped portion is seated in groove 16 and is retained in that groove by adjustment of screw 18. The length of radial portion 22 is such that when arcuate portion 21 is in groove 16, portion 23 will lie substantially on the axis of spud 3.

A sleeve 25 is slidably mounted on the axial portion 23 of the rod and is provided at its lower end with a plug 26 and at its upper end with an exterior ring 27. The plug 26 and ring 27 afford outwardly projecting shoulders for a purpose presently to be stated. This sleeve may be retained on the rod 23 by any suitable means, for example, by a nut 28 screwed onto the upper end of the rod, slidably engaging the inner surface of the sleeve 25 and engageable with plug 26 when sleeve 25 is at the upper end of its stroke. The radial portion of the rod determines the lowermost position of sleeve 25.

The float spool 30 has a cylindrical part 31 slidably mounted on sleeve 25 for axial movement between plug 26 and ring 27 and a part 32 which is of a size and shape to fit in the hole at the bottom of an ordinary float valve 33, and which has a groove 34 to receive the edge of the float valve defining the bottom hole thereof and which is provided with drain holes 35 through which water may drain out of the valve 33 when the latter is seated on seat 4. In Fig. 1 the sleeve 25 is in its lowest position and the flush valve 33 is midway between its bottom and top positions.

The float valve may be connected to a float lever by any suitable means, for example, by a flexible connector 40 attached to the valve by a screw 41 in the threaded opening thereof and by a hook 42 attaching the upper end of the flexible member to the float lever 43. This flexible member may be made of various materials, for example, nylon cord or tape composed of glass or plastic material such as polyethylene. In general any suitable flexible material may be used for this purpose since its only function is to lift the float valve off its seat. Since the valve is hollow, it will remain in its upper position until the water level falls enough for the valve to seat.

Since the axial portion 23 of rod 20 is mounted on the axis of the valve seat, and since the float valve is guided along that axis by the sleeve 25 and spool 30, it will be seen that the valve will be guided accurately to its seat and that the valve will thus be correctly seated at all times with the result that there will be substantially no leakage of water past the valve.

The guide rod may be made of various materials but preferably it consists of spring-tempered bronze wire. The sleeve 25 and spool 30 may be made of any suitable material such as nylon, polystyrene, or other suitable plastic compositions.

Fig. 5 shows a spool 30a slightly different from the spool of Fig. 1. Its parts 31a, 32a, 34a and 35 correspond closely with correspondingly numbered parts of the spool of Fig. 1.

Having thus described this invention in such full, clear, concise and exact terms as to enable any person skilled in the art to which it pertains to make and use the same, and having set forth the best mode contemplated of carrying out this invention, I state that the subject-matter which I regard as being my invention is particularly pointed out and distinctly claimed in what is claimed, it being understood that equivalents or modifications of, or substitutions for, parts of the above specifically described embodiments of the invention may be made without departing from the scope of the invention as set forth in what is claimed.

What is claimed is:

1. A water closet flush valve assembly comprising a spud having a valve seat at its upper end, a valve guide including a rod secured within the spud near its lower end and including a straight portion positioned approximately on the axis of said spud, a float valve to seat on said valve seat, and means to guide said valve in its movements toward and away from said seat, said means including a sleeve slidable on the straight portion of said rod, means to limit the movement of the sleeve on the rod, a spool secured to the lower part of the valve and slidable on said sleeve and means limiting the movement of the spool on the sleeve.

2. A water closet flush valve assembly comprising a spud having a valve seat at its upper end, a valve guide including a rod secured to the spud near its lower end and including a straight portion positioned approximately on the axis of said spud and extending to above said seat, a float valve to seat on said seat and having an opening in its lower part, and means to guide said valve in its movements toward and away from said seat, said means including a sleeve slidable on the straight portion of said rod, means to limit the movement of the sleeve on the rod, a spool slidable on said sleeve, and means limiting the movement of the spool on the sleeve, said spool extending into the opening in the bottom of the valve and having a groove to receive the edge of the valve defining said opening.

3. A water closet flush valve assembly comprising a spud having a valve seat at its upper end, a valve guide including a rod having an arcuate portion secured to the spud near its lower end, a straight portion positioned approximately on the axis of said spud and a radial portion joining the arcuate and straight portions, a float valve to seat on said valve seat, and means to guide said valve in its movements toward and away from said seat, said means including a sleeve slidable on the straight portion of said rod between said radial portion and a nut on the upper end of the rod, a spool slidable on said sleeve, means on the sleeve limiting the movement of the spool on the sleeve, and means securing the spool to the float valve.

4. A water closet flush valve assembly comprising a spud having a valve seat at its upper end, an inward projection near its lower end defining an arcuate groove and an inwardly projecting ear, a valve guide including a rod having an arcuate portion disposed in said groove, a radial portion extending inwardly therefrom and an axial portion positioned approximately on the axis of said spud, a screw in said ear engageable with said arcuate portion of said rod to hold the rod in fixed position relative to the spud, a float valve to seat on said valve seat having an opening in its bottom and having flexible means connecting said valve to a flush lever, and means to guide said valve in its movements toward and away from said seat, said means including a sleeve slidable on the axial portion of said rod, a nut on the rod to limit the upward movement of the sleeve, a spool slidable on said sleeve, means limiting the movement of the spool on the sleeve, the spool extending into the opening in the bottom of the valve and having a groove to receive the edge of the valve defining said opening.

References Cited in the file of this patent

UNITED STATES PATENTS

| | | |
|---|---|---|
| 1,263,534 | Curtin | Apr. 23, 1918 |
| 2,206,235 | Powers | July 2, 1940 |
| 2,561,877 | Limongelli | July 24, 1951 |
| 2,736,903 | Wolf et al. | Mar. 6, 1956 |
| 2,758,314 | Granger | Aug. 14, 1956 |